United States Patent Office 3,442,954
Patented May 6, 1969

3,442,954
TRANSITION METAL SALTS OF ALKYLBENZENE SULFONIC ACIDS FOR SELECTIVE OXIDATION REACTIONS
Richard E. Crocker, Anaheim, Calif., Martin L. Kaplan, Murray Hill, N.J., and Charles H. Hayes, Houston, Tex., assignors to Atlantic Richfield Company, Philadelphia, Pa., a corporation of Pennsylvania
No Drawing. Continuation-in-part of application Ser. No. 573,208, Aug. 18, 1966. This application Jan. 23, 1968, Ser. No. 703,842
Int. Cl. C07c 45/04
U.S. Cl. 260—592                    8 Claims

ABSTRACT OF THE DISCLOSURE

A class of catalysts, for selective oxidation of organic compounds having an alkyl group connected to doubly bonded carbon atom for preferably producing compounds which include a carbonyl group, which consists of transition metal salts of alkylbenzene sulfonic acids and a process for utilizing such catalysts are disclosed. The sulfonic acid may be unpolymerized, for example, the cobalt salt of para-toluene sulfonic acid, or polymerized or crosslinked with a network forming agent in the form of a macroreticular ion-exchange resin, for example, the cobalt salt of a macroeticular alkylbenzene sulfonic acid ion-exchange resin.

CROSS-REFERENCE TO RELATED APLICATIONS

This is a continuation-in-part of our copending application Ser. No. 573,208, filed Aug. 18, 1966, now abandoned, which is in turn a continuation-in-part of application Ser. No. 126,828, filed July 17, 1961, now abandoned.

BACKGROUND OF THE INVENTION

Field of the invention

This invention relates to a catalytic oxidation process for organic compounds and, more particularly, to an improved catalytic oxidation process utilizing an improved catalyst which may be a transition metal salt of an alkylbenzene sulfonic acid or a transition metal salt of a macroreticular polymerized alkylbenzene sulfonic acid, in the form of an ion-exchange resin.

Description of the prior art.

Catalystic oxidation of the organic compounds, in particular, the oxidation of hydrocarbons such as olefins and alkyl substituted aromatics, in the liquid phase utilizing a cobalt catalyst and a bromine promoter or cocatalyst is described in the prior art. It is known, for example, that such compounds can be oxidized in a solvent-catalyst system consisting essentially of acetic acid, ammonium bromine, and cobalt acetate with relatively high efficiency but the selectivity of the oxidation reaction is not always good and is sometimes unpredictable.

Catalysts for use in the gas or liquid phase are often deposited on various substrates for the purpose of extending the surface area of the catalyst. Conventionally, relatively chemically inert substrates such as alumina, magnesia, diatomaceous earth, and the like which are porous or otherwise exhibit large surface areas are selected for supporting catalysts. Sometimes a particular physical support produces an unexpectedly high catalytic action but in most cases the catalytic action of a supported catalyst system can be predicted on the basis of the additive properties of the catalyst involved and the porosity or effective surface area of the catalyst support. Generally, except for a perhaps increased efficiency in catalytic action which permits the use of a reduced quantity of catalyst, the reaction involved will proceed in substantially the same manner, in terms of the end product, regardless of the nature of the physical support for the catalyst.

The use of chemical supports for catalysts, wherein the catalyst is actually chemically reacted with the support, for various reactions has also been suggested but, apparently because of the chemical reaction of the catalyst with the support, the actual effectiveness of such a catalytic system cannot be predicted with any degree of certainty. The utilization of such chemically bound catalysts for oxidation reactions of the type under consideration apparently was not known prior to the initiation of the work leading to the present invention.

Transition metals, generally, are considered as potential catalyst materials for many reactions, including oxidation reactions. Within limits, where one of a group of such metals has been found to have catalytic action for a given process under a specified set of conditions, one may predict catalytic action under similar circumstances for other transition metals, although the relative effectiveness of the various metals is not easily predictable. Transition metals may, then, be considered as candidates in most catalytic reactions but quite unexpected advantages may flow from the utilization of a particular member of the group on occasion.

It will thus be understood that while one skilled in the art may expect one or more of the transition metals to serve as effective liquid phase oxidation catalysts for the class of compounds under consideration and, in view of more specific teachings of the prior art, one may expect cobalt to be particularly effective as an oxidation catalyst under given conditions, it is impossible to predict the nature of oxidation products which may be formed from a knowledge of the catalyst systems generally. It is, accordingly, a principal obejct of this invention to provide a transition metal catalyst having high selectivity for intermediate oxidation reactions.

SUMMARY OF THE INVENTION

Without intending to limit the scope of the invention, since the catalysts of this invention may be utilized in reactions other than those specifically disclosed in the examples set forth herein, the present invention contemplates an oxidation catalyst selected from the group consisting of a transition metal salt of an alkylbenzene sulfonic acid in the free form and a transition metal salt of an alkylbenzene sulfonic acid polymerized or cross-linked to form a macroreticular ion-exchange resin particularly adapted for the oxidation of compounds selected from the group

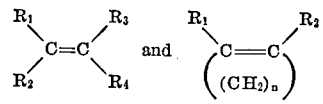

wherein at least one member of the group $R_1$ and $R_2$ is an alkyl, aralkyl, or cycloalkyl group, the remaining members of the group R, $R_2$, $R_3$, and $R_4$ are alkyl, aralkyl, cycloalkyl or hydrogen, and $n$ is a positive integer between 1 and 8; and an alkyl aromatic compound having the formula

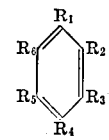

wherein $R_1$ is an alkyl or an aralkyl group, and $R_2$, $R_3$, $R_4$, $R_5$ and $R_6$ are alkyl, cycloalkyl, aralkyl, hydrogen, halogen, carboxy, alkoxy, acyloxy or aryloxy groups; with a reactive oxygen-containing oxidizing agent selected from the group consisting of molecular oxygen-containing gas and combined oxygen. It is, accordingly, a principal object of this invention to provide an improved catalyst and process for using the catalyst.

It is also an object of the present invention to provide an oxidation catalyst having the high specificity for particular oxidation reactions. An additional object of the invention is to provide a process for producing intermediately oxidized organic compounds containing carbonyl groups.

A further object of the invention is the provision of a solvent-catalyst system for carrying out oxidations of compounds of the class under consideration in the liquid phase.

Yet an additional object of the invention is to provide a novel process utilizing an improved catalyst for oxidation reactions generally.

Other objects and a more complete understanding of the present invention may be had by reference to the following specification and by reference to the claims which are intended to constitute the sole limitations of the scope of the present invention.

DESCRIPTION OF THE PREFERRED EMBODIMENTS

One of the preferred catalysts is made by reacting a transition metal salt, such as the carbonate salt, with a selected alkylbenzene sulfonic acid. In an exemplary embodiment, cobalt carbonate and para-toluene sulfonic acid are reacted in equal molar quantities in a minimum of water. The mixture is boiled for approximately 1 hour, until no more evolution of gas is apparent, and the solution is filtered while hot to remove excess cobalt carbonate. Upon cooling, the cobalt para-toluene sulfonate (CTS) crystallizes as a pink compound. The pink crystals are dried for several hours in a vacuum oven at 105° C. and a presusre of less than 1 millimetre of mercury. The catalyst is then a bluish-purple color having the following structure:

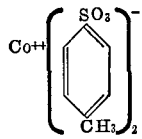

Cobalt dodecylbenzene sulfonate and, for comparison purposes, cobalt benzene sulfonate were prepared in like manner. The same process may also be used to produce the other catalysts of this type by the reaction of cobalt carbonate with the respective alkylbenzene sulfonic acid.

The catalysts prepared as hereinbefore described are utilized in the free or unpolymerized form in the process to be described. It is believed that varying quantities of these catalysts dissolve in the solvent system in which the oxidation reaction is carried out but in the reaction studied the oxidation system generally remained heterogeneous.

Another form of the catalyst is prepared by first forming an insoluble polymer matrix, such as a copolymer having a major portion of styrene and a minor portion of divinylbenzene, a copolymer of styrene, ethylvinyl benzene and a divinylbenzene or a phenol-formaldehyde condensate resin, into which active acidic groups can be introduced by the appropriate chemical reaction, for example, sulfonation, whereby a resinous, insoluble composition containing sulfonic acid groups on the aromatic nuclei of the copolymer is formed. The desired transition metal ion or ions, selected from group VIII and subgroups I–B, V–B, VI–B and VII–B of the Periodic Table, can be readily exchanged with the available hydrogen ions on the acidic groups of the resins. Either sulfonic acid or methylene sulfonic acid groups on the resin are preferred for the present embodiment of the catalyst of this invention.

Ion-exchange resins inherently contain a skeletal framework to which an ion-exchangeable group is attached in such a manner that the group is pendant to the skeletal framework whereby said ion-exchange group may be asymmetrically solvated. Thus, the catalystic metal exchanged on the ion-exchange resin is apparently readily accessible to the reactants where macroreticular resins, having a permanently open pore structure, are involved but this is apparently not true of the hydrophyllic resins wherein microporous resins which swell in water to become macroporous are involved. It has been found that while macroreticular resins of the alkyl sulfonic acid type loaded with a transition metal ion are not only highly effective but produce an unexpectedly high selectivity for certain oxidation reactions the similar chemical structure of microporous resins are ineffective as catalysts in organic solvent systems. Apparently, this is because the pore openings are not large enough to admit reactants sufficiently to support a reaction. Thus, it becomes necessary to distinguish between classes of catalysts having substantially the same chemical makeup but being physically in different forms.

The class of catalysts of the present embodiment of the invention is produced by loading macroreticular ion-exchange resins such as those mentioned above with any ionic form of catalytic reactive transition metal, i.e., catalytically active metal ions from group VIII and the subgroups I–B, V–B, VI–B and VII–B of the Periodic Table, such as a salt of a lower aliphatic carboxylic acid, tetraacetate complex, a borate, a halide, a nitrate, or a carbonate, etc. Although it is postulated that the chemically combined metal ion is held by the ion-exchange resin catalyst during the oxidation process, it is also possible that the transition metal-loaded ion-exchange resin releases the transition metal ion to the oxidation mixture in some degree. This embodiment of the inventive catalyst contemplates exchanging a sufficient amount of catalytically active transition metal, or a mixture of transition metal ions, to saturate the exchange medium in the resin. This amount is generally between 1 and 25 percent by weight of the ion-exchange resin, preferably between 8 and 15 percent, and optimally 10 to 12 percent. Resin characteristics often determine the metal-to-resin ratio.

In the oxidation reactions with which this invention is most advantageously used, a cocatalyst or promoter such as a soluble bromine compound or elemental bromine, may be utilized with the metal-loaded resin of our present invention to increase the specificity and reactivity of the catalytic system to oxidation reactions. Such bromine compounds, as ammonium bromide, potassium bromate, tetrabromoethane, benzyl bromide, hydrogen bromide, and similar bromide ion or bromide complex supplying compounds, are suitable as cocatalysts. Where a bromine cocatalyst is used it is desirable to use a cocatalyst in a proportion between 10 and 100 percent of the transition metal-loaded ion-exchange resin, by weight. Preferably, however, the amount of bromine present is between 30 and 50 percent by weight of the amount of transition metal-loaded ion-exchange resin, using this embodiment of the catalyst.

A solvent for the oxidation reactions of the present invention which is inert to oxidation and will dissolve the organic compound subjected to oxidation is desirably utilized. Preferably, such solvents are selected from the lower aliphatic monocarboxylic acids containing between 1 and 8 carbon atoms in the molecule, for example, acetic, propionic, butyric, trimethyl acetic, isobutyric, tribromoacetic, trichloroacetic, trifluoroacetic, or aromatic acids such as phenylacetic, toluic, and benzoic acids. The solvent is preferably present in an amount between 5 and 25 times the amount of reactant hydrocarbon present.

With respect to oxidation reactions, our present process can be applied generally to any alkylaromatic compound from mono- to hexa-substituted benzene as:

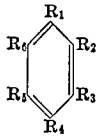

where $R_1$ may be an alkyl or an aralkyl group. The other R groups may be the same as $R_1$ or may be any or each of the following: alkyl, cycloalkyl, aralkyl, hydrogen, halogen, nitro, carboxyl, alkoxy, acyloxy and aryloxy. Similarly, multi-ring aromatic compounds may also be oxidized. Such compounds have 2 or more rings of which one or more may be saturated with hydrogen. This group of compounds may also have any number of the R groups listed above.

Compounds oxidizable by our present process include generally, toluene, o-, m-, and p-xylene, mesitylene, pseudocumene, hemimellitene, durene, prehnitene, isodurene, pentamethylbenzene, hexamethylbenzene, ethylbenzene, cumene, cymene, o-, m-, and p-ethyltoluene, alkylnaphthalenes, tetrahydronaphthalene, indene, indane, etc.; partially oxidized alkylaromatic compounds such as alcohols, aldehydes, ketones, etc., i.e. benzaldehyde, substituted benzaldehydes, acetophenone, substituted acetophenone, benzyl alcohols, substituted benzyl alcohols, etc. A few of the oxidation products, e.g. alcohols, aldehydes, ketone and carboxylic acids, etc. corresponding to the above products are benzyl alcohols, benzaldehyde, acetophenone, benzoic acid, o-methylbenzylalcohol, α,α-orthoxylenediol, o-toluic acid, phthalic acid, phthalic anhydride, o-tolualdehyde, acetylbenzoic acid, etc. The utility of many of the above oxidation products as plasticizers and solvents is common knowledge. Additionally, acetophenone, for example, is used as a major constituent of several types of perfume, for flavoring tobacco, and as a solvent for cellulose ethers, esters and resins.

Olefins within the following general group are suitable for oxidation by our present process:

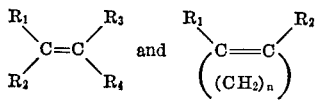

where $R_1$, $R_2$, $R_3$, and $R_4$=alkyl, aralkyl, cycloalkyl, or hydrogen and $n=1-8$. For example, propene, 1-butene, 2-butene, isobutene, 2-methyl-2-butene, cyclopentene, cyclohexene, etc. The oxidation reactions generally yield the corresponding epoxides, alcohols, ketones, aldehydes and acids, e.g. ethyl alcohol, 3-methylcrotonic acid, 3-methyl-2-butanone, 2-methyl-1-butene, the acetates of 2-methyl-1-butene - 3 - ol, 2-methyl-2-butene-4-ol, 2-methyl-2,3-dihydroxybutane, etc.

Oxygen may be supplied in the oxidation reactions of our present invention by molecular oxygen, i.e., oxygen or an oxygen-containing gas, such as air, or a reactive oxygen containing compound such as hydrogen peroxide or sulphur dioxide, etc. Oxygen is supplied at the rate of 10–10,000 ml./hr., or more depending on the reaction vessel, for approximately 1 hour.

With respect to the oxidation reactions conducted according to our present invention, a reaction temperature of at least 50° C. is preferred, optimally between 75° C. and 120° C.

The transition metal catalysts of the present invention may also be used as catalysts for other processes, e.g. as a polymerization catalyst for the preparation of high or low molecular weight polymers, a hydrogenation catalyst, or a Friedel-Crafts type catalyst, such as for a halogenation of aromatics and alkyl aromatics.

In a specific embodiment, catalyst was prepared for use according to the present invention by reacting 50 grams (0.23 equivalence of H+ ions) of a macroreticular, sulfonated, cross-linked polystyrene having a large internal surface area due to its macroporous or macroreticular structure, with 87.5 grams (0.35 mols) of cobaltous acetate $Co(C_2H_3O_2)_2 \cdot 4H_2O$ in 300 millilitres of deionized water for 72 hours at 25° C. with sufficient agitation to suspend the ion-exchange resin beads in the aqueous solution. (In the preparation of the resin prior to the above exchange reaction, the macroreticular structure was produced by polymerizing the polystyrene resin in the presence of a liquid in which the monomer is soluble and the polymer is insoluble, whereby a separation of the phases occurs during polymerization.) The resulting cobalt-loaded ion-exchange resin catalyst was washed with sufficient deionized water to free the resin of uncomplexed cobalt ions. The hydrated catalyst was pink and after drying thoroughly at 105° C. and 1 mm. or less of pressure, a deep blue material was obtained containing 12.00 percent by weight cobalt.

By way of example the following experiments utilizing the catalyst of our invention are described hereunder in detail:

EXPERIMENT I

Ethylbenzene (0.5 mole, 53 grams) was dissolved in 95 milliliters of glacial acetic acid and 5 milliliters of acetic anhydride, and charged into a one-liter Morton flask with 7.90 grams of a cobalt-loaded cross-linked polystyrene sulfonic acid ion-exchange resin (prepared as mentioned above) containing 11.28% cobalt and 2.95 grams of ammonium bromide. The mixture was temperature equilibrated at 90° C. for 30 minutes with sufficient agitation to suspend the catalyst beads. Oxygen was passed through a sulfuric acid scrubber and into the reaction mixture at 20 milliliters per minute for 24.7 hours. As shown in Example 3 of the attached Table I, 91 mole percent yield of acetophenone, 6 mole percent alpha-phenethyl acetate and 2 mole percent styrene were obtained.

Experiment I was repeated at 105° C., 75° C., and 50° C., and the results are tabulated in Table I. Parallel runs using cobalt acetate as the catalyst (with the same amount of cobalt) and the same amount of bromide ion in the form of ammonium bromide without the ion-exchange resin catalyst as a cocatalyst, were run at each of the above temperatures and at 90° C. The results are tabulated in Table I, Examples 1, 2, 4 and 11 to 14.

EXPERIMENT II

In order to determine if cobalt salts of other sulfonic acid resins were good oxidation catalysts, an oxidation reaction was carried out with a different macroreticular sulfonic acid ion-exchange resin than had previously been used. In this oxidation, 6.42 grams of the macroreticular alkylbenzene sulfonic acid ion-exchange resin which was loaded with 0.015 mole of cobalt, along with 2.95 grams of ammonium bromide, was used to catalyze the oxidation of 53 grams of ethylbenzene dissolved in 100 mls. of glacial acetic acid. The solution was equilibrated at 90° C. for 30 minutes and oxygen was bubbled through the solution at the rate of 20 mls. per minute. After 24 hours, only 2.6 percent of the ethylbenzene had not been oxidized and 91 percent of the ethylbenzene had been oxidized to acetophenone, as tabulated in Example 9, Table I.

Under identical conditions, 10 grams of cobalt-loaded microporous alkylsulfonate ion-exchange resin, along with 3.5 grams of ammonium bromide, were utilized in an attempt to oxidize 53 grams of ethylbenzene dissolved in 95 mls. of acetic acid and 5 mls. of acetic anhydride. After 24 hours at 90° C., following the one-half hour equilibration period, gas chromatographic analysis indicated that no oxidation had occurred. This is shown in Example 10 of Table I.

It was apparent from this experiment that the unexpectedly beneficial results and high selectivity which were achieved by using cobalt-loaded macroreticular alkylbenzene sulfonate resins did not accrue when microporous resins of the same chemical makeup were used.

EXPERIMENT III

The results of four exemplary experiments designed to illustrate the criticality of the chemical composition of the cobalt catalyst are shown in Examples 5, 6, 7 and 8. By way of comparison, Examples 5, 6 and 7 will be considered together first. The same molar proportions of the catalyst and the reactants as described in Experiments I and II were used in these exemplary reactions.

In Example 5, approximately 0.015 mole of cobalt benzene sulfonate was used to catalyze the reaction of ethylbenzene to benzophenone. After the reaction had run for 7 hours at 90° C., 11.3 percent of the ethylbenzene remained unreacted and only 60 percent had been converted to acetophenone.

Example 6 shows the comparative effect of cobalt paratoluene sulfonate under the same conditions wherein there was no unreacted ethylbenzene and 96.5 percent of the ethylbenzene had been oxidized to acetophenone.

By way of comparison, as shown in Example 7, the catalyst system of the prior art left 13.2 percent of the ethylbenzene unreacted and converted only 46.2 percent of the ethylbenzene to acetophenone.

Example 8, run under the same conditions with the same molar quantities, further illustrates the high selectivity in oxidation reactions which can be accomplished using cobalt salts of alkylbenzene sulfonic acids as compared with simply cobalt salts of benzene sulfonic acids and the cobalt catalysts of the prior art.

A study of Table I leads to the following conclusions:

EXPERIMENT IV

A reaction mixture including 100 mls. of acetic anhydride, 56.1 grams of diisobutylene, 2.95 grams of ammonium bromide, and 2.55 grams of cobalt-loaded macroreticular sulfonic acid ion-exchange resin was held at 90° C. for 24 hours. Analysis indicated 80 mole percent conversion. The major product was methyl neopentyl ketone.

EXPERIMENT V

Experiment IV was substantially duplicated except that cobalt bromide was used as a catalyst. The yield of methyl neopentyl ketone was approximately 30 percent less than the yield of the same compound in experiment IV.

EXPERIMENT VI

The experimental conditions of Example 3 were repeated using 53 grams (0.5 mole) of orthoxylene, a reaction temperature of 105° C. and a reaction time of 24.0 hours. An analysis of the reaction products indicated the following mole yields: 36 percent orthotoluic acid, 4.1 percent phthalic acid, 11.8 percent orthotolyol acetate, 11.6 percent phthalide and 3.5 percent tolualdehyde.

EXPERIMENT VII

The experimental conditions of Example 6 were substantially duplicated for oxidizing orthoxylene, except that the reaction time was 8 hours. Analysis indicated 100 mole percent conversions; the major product being orthotoluic acid.

In addition to the above experiments, the catalyst system of this invention has been used successfully, under the conditions described, for the oxidation of ethyltolu-

TABLE I.—COMPARATIVE ETHYLBENZENE OXIDATION DATA

| Example | Temperature, ° C. | Catalyst system (plus NH$_4$Br) | Reaction time, hrs. | Unreacted ethylbenzene [1] | Yields [1] | | | |
|---|---|---|---|---|---|---|---|---|
| | | | | | Acetophenone | α-Phenethyl acetate | Styrene | α-Phenethyl alcohol |
| 1 | 105 | CoRS [2] | 24.5 | 0 | 81 | 14 | 5 | |
| 2 | 105 | Cobalt acetate | 24.5 | 0 | 67 | 23 | 10 | |
| 3 | 90 | CoRS [3] | 24.7 | 1.2 | 91 | 6 | 2 | |
| 4 | 90 | Cobalt acetate | 24.7 | 2.6 | 60 | 29 | 7 | 2 |
| 5 | 90 | Cobalt benzene sulfonate | 7 | 11.3 | 60 | 22 | 5.2 | 1.5 |
| 6 | 90 | Cobalt-p-toluene sulfonate | 7 | 0 | 96.5 | 3.0 | 0.5 | |
| 7 | 90 | Cobalt acetate | 7 | 13.2 | 46.2 | 24 | 0.6 | 8.4 |
| 8 | 90 | Cobalt dodecylbenzene sulfonate | 20 | 1.4 | 87 | 8.8 | | |
| 9 | 90 | CoRS [2] | 24 | 2.6 | 91.5 | 5.1 | | |
| 10 | 90 | CoRS [3] | 24 | 100 | | | | |
| 11 | 75 | CoRS [2] | 50 | 0 | 98 | 2 | | |
| 12 | 75 | Cobalt acetate | 50 | 5.8 | 66 | 19 | 4 | 5 |
| 13 | 50 | CoRS [2] | 24 | 100 | | | | |
| 14 | 50 | Cobalt acetate | 24 | 100 | | | | |

[1] Mole percent. [2] Macroreticular cobalt-loaded polystyrene sulfonic acid ion-exchange resin. [3] Microporous cobalt-loaded polystyrene sulfonic acid ion-exchange resin.

First, it will be apparent that unexpectedly high oxidation efficiencies and high selectivity for oxidation reactions result from the use of certain cobalt salts of alkylbenzene sulfonic acids as oxidation catalysts.

Secondly, the cobalt salts of benzene sulfonic acid do not give the same unexpectedly high efficiency and selectivity for oxidation reactions as do the cobalt salts of alkylbenzene sulfonic acids. The cobalt salts of benzene sulfonic acid, however, gives very slightly better results in oxidation reactions of the class under consideration than the catalyst system of the prior art under similar conditions.

Thirdly, it will be noted that not all cobalt salts of alkylbenzene sulfonic acids are beneficial as oxidation catalysts. That is, while macroreticular ion-exchange resins composed of polymerized cobalt alkylbenzene sulfonates are very beneficial as oxidizing agents and give unexpectedly high selectivity, microporous ion-exchange resins having the same chemical composition, except for the degree and nature of polymerization and cross-linking, are substantially ineffective as oxidation catalysts and, indeed, are even less effective than the catalysts of the prior art.

The following experiments are given as exemplary of the types of oxidation reactions which may be conducted using the catalyst system of this invention.

ene, 2-methyl-2-butene, cyclohexenone, 1-methyl-1-cyclohexane, and cyclohexylbenzene but complete comparative data, as presented with respect to ethylbenzene, are not available. Such comparative data as are available indicates the general superiority of this oxidation catalyst system for compounds of the class defined.

While the prior art suggested, and experiments performed during this study confirmed, that cobalt would be superior to most of the transition metals as catalyst for the particular oxidation reactions under consideration, it will be understood that other transition metals may be used. For obvious reasons, the results tabulated were from the runs made with cobalt so that the data would be more nearly comparable and, in most cases, only a single material variable is involved to permit direct comparison of the results between analogous experiments. Oxidation reactions using the process of this invention, and the catalyst and catalyst system of the invention, have also been run with manganese, and with catalysts utilizing a mixture of manganese and cobalt, for example, a manganese-cobalt loaded macroreticular alkylbenzene sulfonate resin. Actually, the selectivity for the oxidation reactions desired was substantially the same, i.e., in excess of 90 percent of the ethylbenzene was oxidized to acetophenone, and the initial rate constant was somewhat higher than the rate constant for the analogous reaction utilizing only cobalt or only manganese. Other transition metal salts of alkylbenzene sulfonic acids when utilized as catalysts in the oxidation reaction lead to similar results, although the reaction rate is not predictable.

All of the above oxidations were carried out in the liquid phase but the oxidation of hydrocarbons may also be performed in the gas phase.

It will be understood that the foregoing experiments were selected to illustrate the process and the catalyst system of this invention and not to limit the scope of the invention. It will be understood that while the examples, were selected to provide for more directly comparable data than would be available using a large number of hydrocarbons in oxidation reactions, the particular oxidation reactions and the particular reactants selected are merely exemplary of the invention and hydrocarbons of the class defined may be utilized in carrying out the invention with only such changes in quantities and operating conditions as would be well within the skill of one familiar with this art having the present teachings before him. Accordingly, it is contemplated that the scope of the invention shall be defined and limited only by the following claims.

We claim:

1. In a process for oxidizing an organic compound selected from the group consisting of an olefin selected from the group consisting of

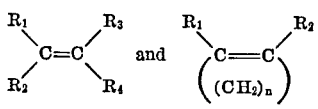

wherein at least one member of the group $R_1$ and $R_2$ is an alkyl, aralkyl, or cycloalkyl group, the remaining members of the group $R_1$, $R_2$, $R_3$ and $R_4$ are alkyl, aralkyl, cycloalkyl or hydrogen, and $n$ is a positive integer between 1 and 8; and an alkyl aromatic compound having the formula

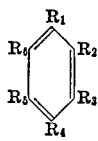

wherein $R_1$ is an alkyl or aralkyl group, and $R_2$, $R_3$, $R_4$, $R_5$ and $R_6$ are alkyl, aralkyl, hydrogen, halogen, carboxy, alkoxy, cycloalkyl, acyloxy or aryloxy groups; by reacting said compound in the liquid phase with a reactive oxygen containing oxidizing agent selected from the group consisting of molecular oxygen, $H_2O_2$ and $SO_2$ in the presence of a transition metal catalyst, the improvement in which the catalyst is a composition selected from the group consisting of cobalt, manganese and cobalt-manganese salts of a substantially unpolymerized alkylbenzene sulfonic acid and cobalt, manganese and cobalt-manganese salts of macroreticular polymerized alkylbenzene sulfonic acid ion-exchange resins, at a temperature of greater than about 50° C.

2. The process of claim 1 wherein the liquid phase includes aliphatic monocarboxylic acid having 1 to 8 carbon atoms per molecule.

3. The process of claim 1 wherein the liquid phase includes bromine.

4. A catalyst-solvent medium for oxidizing an organic compound selected from the group consisting of an olefin selected from the group consisting of

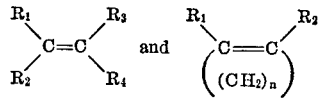

wherein at least one member of the group $R_1$ and $R_2$ is an alkyl, aralkyl, or cycloalkyl group, the remaining members of the group $R_1$, $R_2$, $R_3$ and $R_4$ are alkyl, aralkyl, cycloalkyl or hydrogen, and $n$ is a positive integer between 1 and 8; and an alkyl aromatic compound having the formula

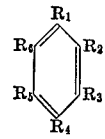

wherein $R_1$ is an alkyl or an aralkyl group, and $R_2$, $R_3$, $R_4$, $R_5$ and $R_6$ are alkyl, cycloalkyl, aralkyl, hydrogen, halogen, carboxy, alkoxy, acyloxy or aryloxy groups, with a reactive oxygen containing oxidizing agent which comprises: a monocarboxylic acid having from 1 to 8 carbon atoms per molecule, bromine in ionic form and a transition metal salt of a substantially unpolymerized alkylbenzene sulfonic acid or a transition metal salt of a macroreticular polymerized alkylbenzene sulfonic acid ion-exchange resin.

5. The catalyst-solvent medium of claim 4 wherein the transition metal is cobalt.

6. A selective oxidation process comprising: reacting a compound selected from the group consisting of

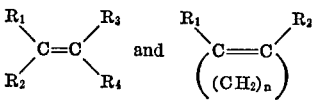

wherein at least one member of the group $R_1$ and $R_2$ is an alkyl, aralkyl, or cycloalkyl group, the remaining members of the group $R_1$, $R_2$, $R_3$ and $R_4$ are alkyl, aralkyl, cycloalkyl or hydrogen, and $n$ is a positive integer between 1 and 8; and an alkyl aromatic compound having the formula

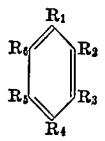

wherein $R_1$ is an alkyl or an aralkyl group, and $R_2$, $R_3$, $R_4$, $R_5$ and $R_6$ are alkyl, cycloalkyl, aralkyl, hydrogen, halogen, carboxy, alkoxy, acyloxy or aryloxy groups, with a reactive oxygen containing oxidizing agent selected from the group consisting of molecular oxygen, $H_2O_2$ and $SO_2$ in the liquid phase in the presence of a catalyst selected from the group consisting of a cobalt, cobalt-manganese or manganese salt of a substantially unpolymerized alkylbenzene sulfonic acid and a cobalt, cobalt-manganese or manganese salt of a macroreticular polymerized alkylbenzene sulfonic acid ion-exchange resin and producing a carbonyl containing compound, at a temperature of greater than about 50° C.

7. The process of claim 6 wherein the liquid phase includes a monocarboxylic acid having 1 to 8 carbon atoms per molecule and bromine in ionic form and wherein the transition metal is cobalt.

8. The process of claim 7 wherein the compound to be reacted is ethylbenzene and the oxidation product is acetophenone.

References Cited

UNITED STATES PATENTS 1,694,122  12/1928  Jaeger _____ 260—524

(Other references on following page)

| | | UNITED STATES PATENTS | |
|---|---|---|---|
| 2,245,528 | 6/1941 | Loder | 260—524 |
| 2,833,816 | 5/1958 | Saffer et al. | 260—524 |
| 2,891,999 | 6/1959 | Langer | 260—614 |

OTHER REFERENCES

Kressman: Manufacturing Chemist, 454–458 (1956).

DANIEL D. HORWITZ, *Primary Examiner.*

U.S. Cl. X.R.

252—431; 260—346.4, 348.5, 479, 520, 521, 524, 533, 597, 599, 618, 632, 635, 682

PO-1050
(5/69)

UNITED STATES PATENT OFFICE
CERTIFICATE OF CORRECTION

Patent No. 3,442,954                Dated May 6, 1969

Inventor(s) Richard E. Crocker, Martin L. Kaplan, Charles H. Hayes

It is certified that error appears in the above-identified patent and that said Letters Patent are hereby corrected as shown below:

Column 1, line 49, the word "Catalystic" should read --Catalytic--; lines 55-56, the hyphenated word "bromine" should read --bromide--. Column 4, line 8, the word "catalystic" should read --catalytic--. Column 5, line 24, the word "tetraphydronaphthalene" should read --tetrahydronaphthalene--. Column 7, line 55, the word "acid" should read --acids--. Column 9, line 13, the comma after the word "examples" should be deleted.

SIGNED AND
SEALED
FEB 24 1970

(SEAL)
Attest:

Edward M. Fletcher, Jr.
Attesting Officer

WILLIAM E. SCHUYLER, JR.
Commissioner of Patents